(12) United States Patent
Ma

(10) Patent No.: US 6,904,212 B2
(45) Date of Patent: Jun. 7, 2005

(54) SYSTEM AND METHOD FOR COLORING AN OPTICAL FIBER

(75) Inventor: Chung-Shin Ma, Morganville, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 348 days.

(21) Appl. No.: 10/014,224

(22) Filed: Dec. 11, 2001

(65) Prior Publication Data

US 2003/0108311 A1 Jun. 12, 2003

(51) Int. Cl.⁷ .................................................. G02B 6/02
(52) U.S. Cl. ...................... 385/123; 385/128; 385/141
(58) Field of Search ................................. 385/114, 115, 385/123, 126, 127, 128, 141, 147; 427/162, 163.2, 498

(56) References Cited

U.S. PATENT DOCUMENTS

| 4,125,644 | A | 11/1978 | Ketley et al. | ................. 427/36 |
| 4,629,285 | A | 12/1986 | Carter et al. | ............. 350/96.23 |
| 6,026,207 | A | 2/2000 | Reddy et al. | ................ 385/128 |
| 6,317,553 | B1 * | 11/2001 | Harper, Jr. et al. | ......... 385/128 |

* cited by examiner

Primary Examiner—Phan T. H. Palmer

(57) ABSTRACT

An optical fiber is colored to provide a striped pattern while maintaining a substantially uniform diameter of the fiber. In one embodiment, a coating of a first curable material having a base color is applied to an optical fiber core section using a coloring die. One or more stripes of a second curable material are applied using the die to the coating before the coating is fully cured. The stripe has a stripe color different from the base color and is formed in the coating such that the diameter of the fiber remains substantially uniform. In another embodiment, a tandem coloring system is used in which the coating is partially cured and one or more striping nozzles apply stripe(s) to the partially cured coating. In a further embodiment, the base color coating is applied and cured leaving one or more gaps. One or more stripes are applied in the gap(s) and cured to fully cover the fiber with a substantially uniform diameter.

20 Claims, 4 Drawing Sheets

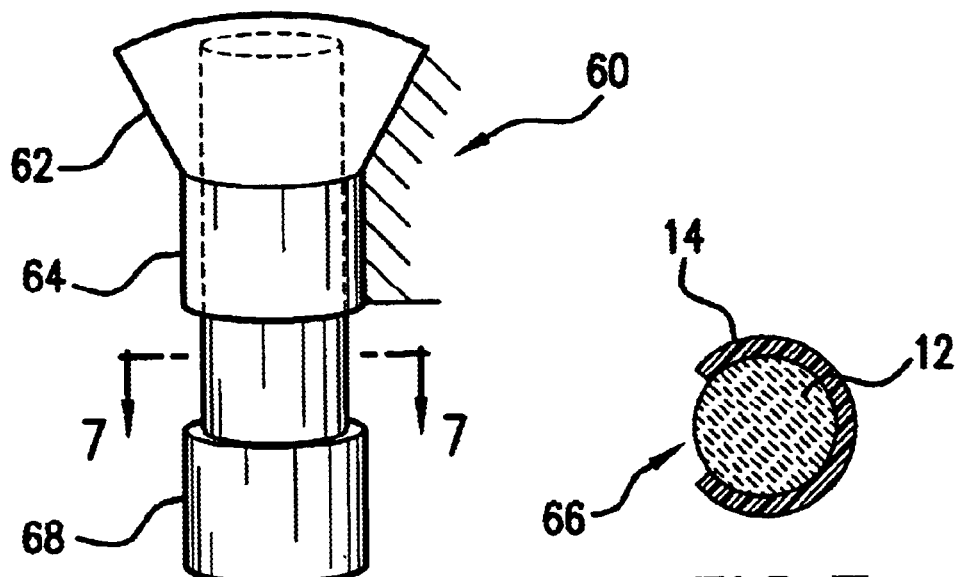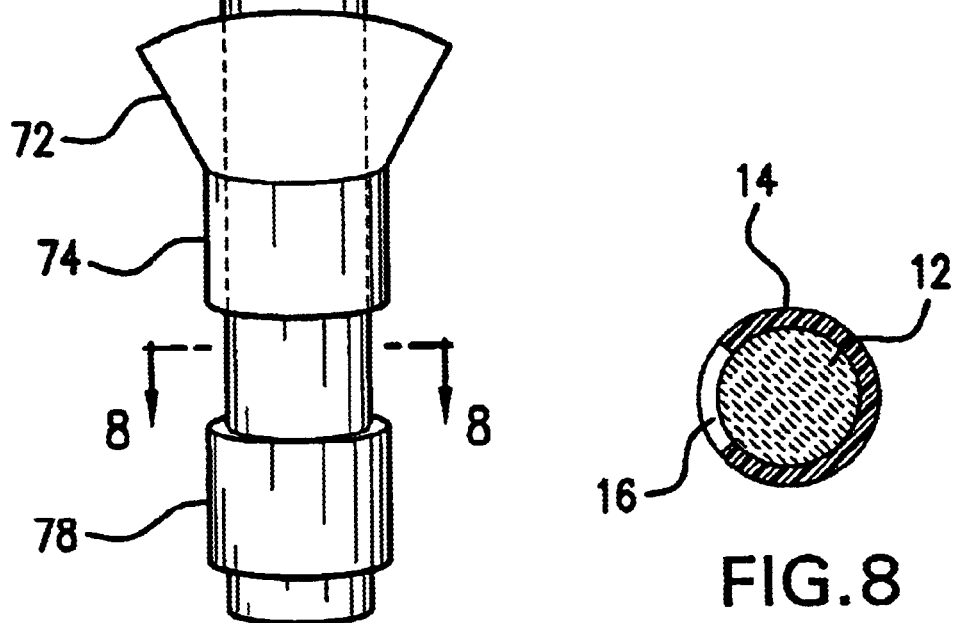
FIG.6
FIG.7
FIG.8

SYSTEM AND METHOD FOR COLORING AN OPTICAL FIBER

TECHNICAL FIELD

The present invention relates to colored optical fibers and more particularly, to a system and method for coloring an optical fiber by applying a colored stripe to a coating of the optical fiber.

BACKGROUND INFORMATION

Optical fibers or waveguides have become increasingly popular as a medium for data transmission, for example, in telecommunications systems. A fiber optic cable typically includes a large number of individual optical fibers. Individual optical fibers within the fiber optic cable often need to be identified separately from other optical fibers, for example, when connecting and splicing cables. According to one technique, individual optical fibers are color-coded to assist in the identification. Examples of methods of making color-coded optical fibers are disclosed in U.S. Pat. Nos. 4,125,644; 4,629,285; and 6,026,207, all of which are fully incorporated herein by reference.

According to one technique of coloring optical fibers, individual optical fibers are colored with a thin layer of UV-curable ink on the outer coating of the fiber. This technique colors the entire coating of the fiber. Because of the limited number of colors available, this technique has limitations when a large number of optical fibers must be color-coded and identified. To allow a larger number of optical fibers to be color-coded, other techniques apply ink over less than the entire circumference or discontinuously along the length of the optical fiber to form different color patterns. For example, other techniques use banding or circumferential striping to provide additional identification.

Although the creation of different color patterns allows a greater number of individual optical fibers to be identified, the existing techniques of creating these patterns adversely affect the performance of the optical fibers. The existing techniques provide partial or discontinuous coverage of ink on top of the coating (either colored or uncolored) of the optical fiber, which alters the diameter of the fiber. When a color stripe is added on top of the base color ink coating, for example, the diameter at the striped portion is larger than the rest of the coating. The non-uniform diameter of the colored optical fiber adds more attenuation to the optical fiber and degrades fiber performance in the fiber optical cable. The techniques of banding or circumferential striping also require an additional step that slows the line speed of the optical fiber during the manufacturing process.

Accordingly, there is a need for a system and method of coloring an optical fiber by creating a color pattern in the base color such that the diameter of the colored optical fiber is substantially uniform longitudinally and circumferentially. There is also a need for a system and method of coloring an optical fiber that minimizes the affect on the line speed and manufacturing process.

SUMMARY

One aspect of the present invention is a method of coloring an optical fiber. The method comprises applying a base color coating of a first curable material having a base color to an optical fiber core section. At least one stripe of a second curable material is applied to the base color coating before these coatings are fully cured. The stripe has a stripe color different from the base color. The stripe is preferably formed in the base color coating such that a diameter of the colored optical fiber remains substantially uniform. The method also comprises curing the base color coating and the stripe.

The first and second curable materials can be the same or different types of materials. In one embodiment, the first and second curable materials are UV-curable materials.

According to one embodiment, the step of applying the base color coating includes coating the fiber core section in a die and passing the coated fiber core section through an exit portion of the die having a longitudinal channel for controlling the diameter of the colored optical fiber. The step of applying the stripe includes injecting the second curable material through an aperture in a side wall of the die.

According to another embodiment, the step of applying the stripe includes injecting the second curable material against the base color coating using a nozzle. In this embodiment, the base color coating is preferably partially cured before applying the stripe using the nozzle. The base color coating and stripe are then passed through a full cure station to cure the base color coating and the stripe. This method can also include passing the fiber having the base color coating and the stripe though another die, prior to the full cure station, to maintain a substantially constant diameter.

According to a further aspect of the present invention, a method of coloring an optical fiber comprises applying a base color coating of a first curable material to an optical fiber core section to form a coated optical fiber core section and applying at least one stripe of a second curable material to the coated optical fiber core section. The stripe has a stripe color different from the base color of the base color coating. The method further comprises controlling a thickness of the base color coating and the stripe such that a diameter of the colored optical fiber remains substantially uniform, and curing the base color coating and the stripe.

According to a further embodiment of the method, the steps of applying and controlling the thickness of the base color coating and the stripe include applying said base color coating using a first die and passing the coated optical fiber core section through the first die to provide a gap in the base color coating. The stripe is applied to the gap in the base color coating using a second die, and the coated optical fiber core section is passed through the second die to maintain the substantially uniform diameter. In this embodiment, the step of curing the base color coating and the stripe includes first curing the base color coating after passing the coated optical fiber core section through the first die and then curing the stripe after passing the coated optical fiber core section through the second die.

According to another aspect of the present invention, a system is provided for coloring an optical fiber. The system comprises a coloring die for receiving the optical fiber core section coated with a coating. A semi-cure station partially cures the coating on the optical fiber after the coated optical fiber core section passes through the coloring die. At least one striping nozzle applies a stripe to the coating on the optical fiber after the coating has partially cured at the semi-cure station. A full cure station fully cures the coating and the stripe applied by the striping nozzle.

According to a further aspect of the present invention, a coloring die is provided for coloring an optical fiber. The coloring die comprises a main portion for receiving the optical fiber core section coated with a base color coating. An exit portion extends from the main portion of the die and defines a substantially straight longitudinal passageway having a substantially uniform diameter for maintaining the colored optical fiber at a substantially uniform diameter. At least one striping tube is coupled to the exit portion for injecting a stripe through a side aperture in the exit portion to apply the stripe to the base color coating.

BRIEF DESCRIPTION OF THE DRAWINGS

These and other features and advantages of the present invention will be better understood by reading the following detailed description, taken together with the drawings wherein:

FIG. 6 is a schematic diagram of a tandem system and method for coloring an optical fiber, according to a further embodiment of the present invention;

FIG. 7 is a cross-sectional view of the fiber after the first coating step taken along line 7—7; and FIG. 8 is a cross-sectional view of the fiber after the second coating step taken along line 8—8.

DETAILED DESCRIPTION OF THE PREFERRED EMBODIMENTS

Figure 1:
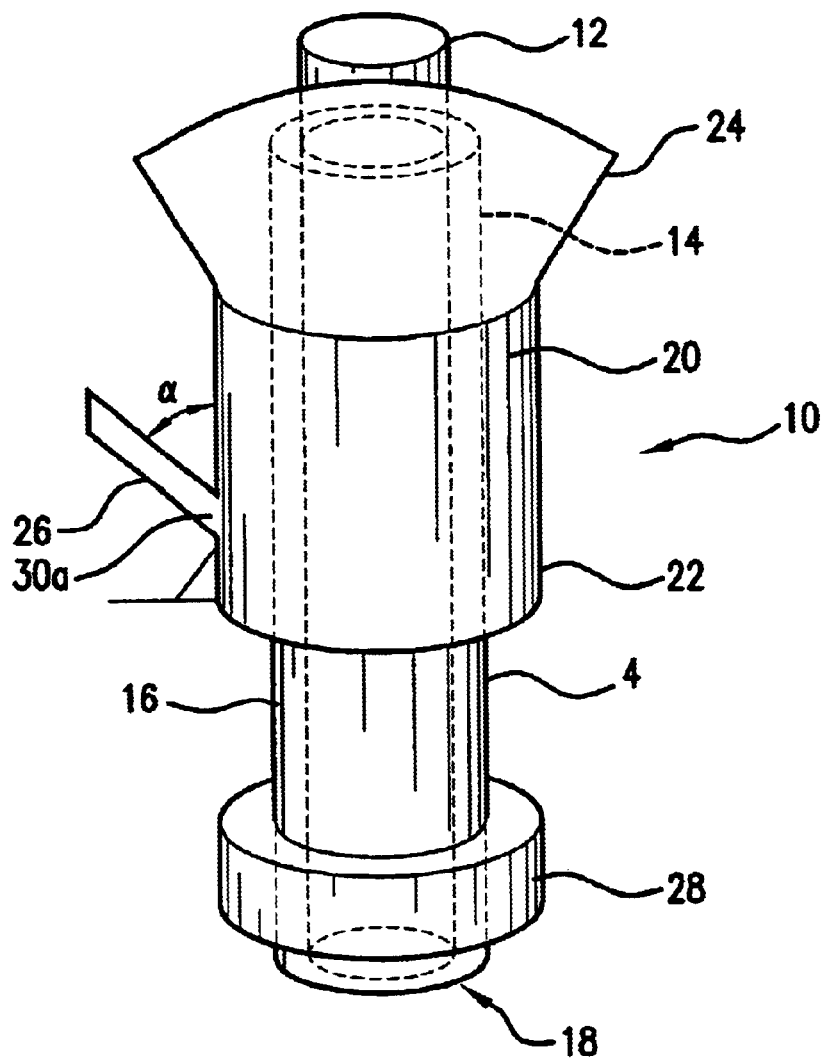
FIG. 1 is a schematic diagram of a system and method for coloring an optical fiber, according to one embodiment of the present invention.

Referring to FIG. 1, one embodiment of the system 10 for coloring an optical fiber is shown. A base color coating 14 of a first curable material is applied to an optical fiber core section 12 having a structure known to those skilled in the art. One or more stripes 16 of a second curable material are applied to the base color coating 14 before the base color coating 14 is fully cured. The one or more stripes 16 have a stripe color(s) different from the base color of the base color coating 14. The base color coating 14 and the stripe(s) 16 are then cured to produce a colored optical fiber 18 having a substantially uniform diameter.

The optical fiber core section 12 can be a dual-coat or single-coat glass core section, as is known to those skilled in the art. The system and method of the present invention can be used with any type of optical fiber core section with any number of coatings or layers provided that the stripe 16 is formed in the outermost base color coating 14.

The first and second curable materials include pigments having the respective base color and stripe color. The first and second curable materials used for the base color coating 14 and stripe(s) 16, respectively, can be the same or different materials, but both materials are preferably cured in the same way. In one embodiment, for example, the first and second curable materials are both UV-curable materials such as the type known to those skilled in the art. One example of the UV-curable material used for the coating 14 and the stripe(s) 16 includes a UV-curable resin, such as DSM-751, available from DSM Desotech, New Castle, Del. The UV-curable material used for the stripe(s) 16 can have a different viscosity and/or surface tension. For example, the second UV-curable materials for the stripe(s) 16 can have a lower viscosity to facilitate injection and a higher surface tension to prevent smearing. The first and second curable materials can also include other types of curable materials.

Each stripe 16 is preferably formed as a longitudinal stripe. Because the longitudinal stripe can be formed while the optical fiber is moving longitudinally through the coating process, there is little or no affect on the line speed. Alternatively, a circumferential stripe can be formed with a substantially uniform diameter; however, this variation of the present invention is likely to slow down the line speed. The stripe 16 can be a continuous stripe or a dashed or broken stripe. The stripe 16 can also have various lengths and widths.

According to one embodiment, the system 10 includes a coloring die 20 that creates the desired thickness of the coating 14 on the optical fiber core section 12 and applies the stripe 16. The optical fiber core section 12 is coated with the coating 14 and then is passed through the coloring die 20. The system 10 also includes a curing station 28 for curing the coating 14 and the stripe(s) 16. The curing station 28 depends upon the type of curable materials used for the coating 14 and stripe(s) 16 and is generally of the type known to those skilled in the art for use in manufacturing optical fibers. One example of the curing station is described in greater detail in U.S. Pat. No. 4,125,644, incorporated herein by reference.

The coloring die 20 includes an exit portion 22 extending from a main portion 24 of the die 20. The exit portion 22 is preferably straight to control the coating thickness and thus the diameter of the coated fiber. The exit portion 22 of the coloring die 20 can be either rigid or flexible.

One or more striping tubes 26 are coupled to the exit portion 22 of the coloring die 20. The striping tube(s) 26 can have different angles relative to the centerline of the die 20 to control the striping effect. For example, the striping tube(s) can have an angle $\alpha$ in the range of about 0–90° such that the second curable materials flows in the same direction as the coated fiber core section 12, as shown in FIG. 1. Alternatively, the striping tube(s) can have an angle $\alpha$ in the range of about 90–180° such that the second curable material flows in an opposite direction of the coated fiber core section 12 (not shown). Each striping tube 26 injects the second curable material through a side aperture 30a in the exit portion 22 such that the second curable material displaces a portion of the uncured coating 14. The stripe 16 is thereby applied to the uncured coating 14 as the coated fiber core section 12 passes through the coloring die 20 and before the coated fiber core section 12 exits the exit portion 22 of the coloring die 20. The coloring die 20 thus maintains the stripe 16 of the second curable material at substantially the same level as the coating 14 to provide a substantially uniform diameter of the colored optical fiber 18.

Figure 2:
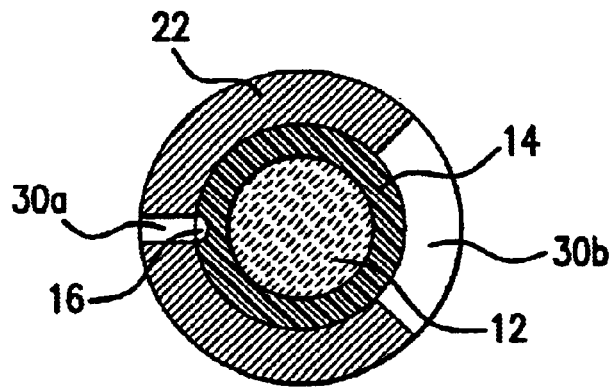
FIG. 2 is a cross-sectional view of a coloring die, according to one embodiment of the present invention.

As shown in greater detail in FIG. 2, the side aperture(s) 30a, 30b in the coloring die 20 can have various sizes depending upon the width of the stripe 16. The small aperture 30a applies the stripe 16 to one small point on the coating 14, whereas the wider aperture 30b applies the stripe 16 to a wider section on the coating 14.

Figure 3:
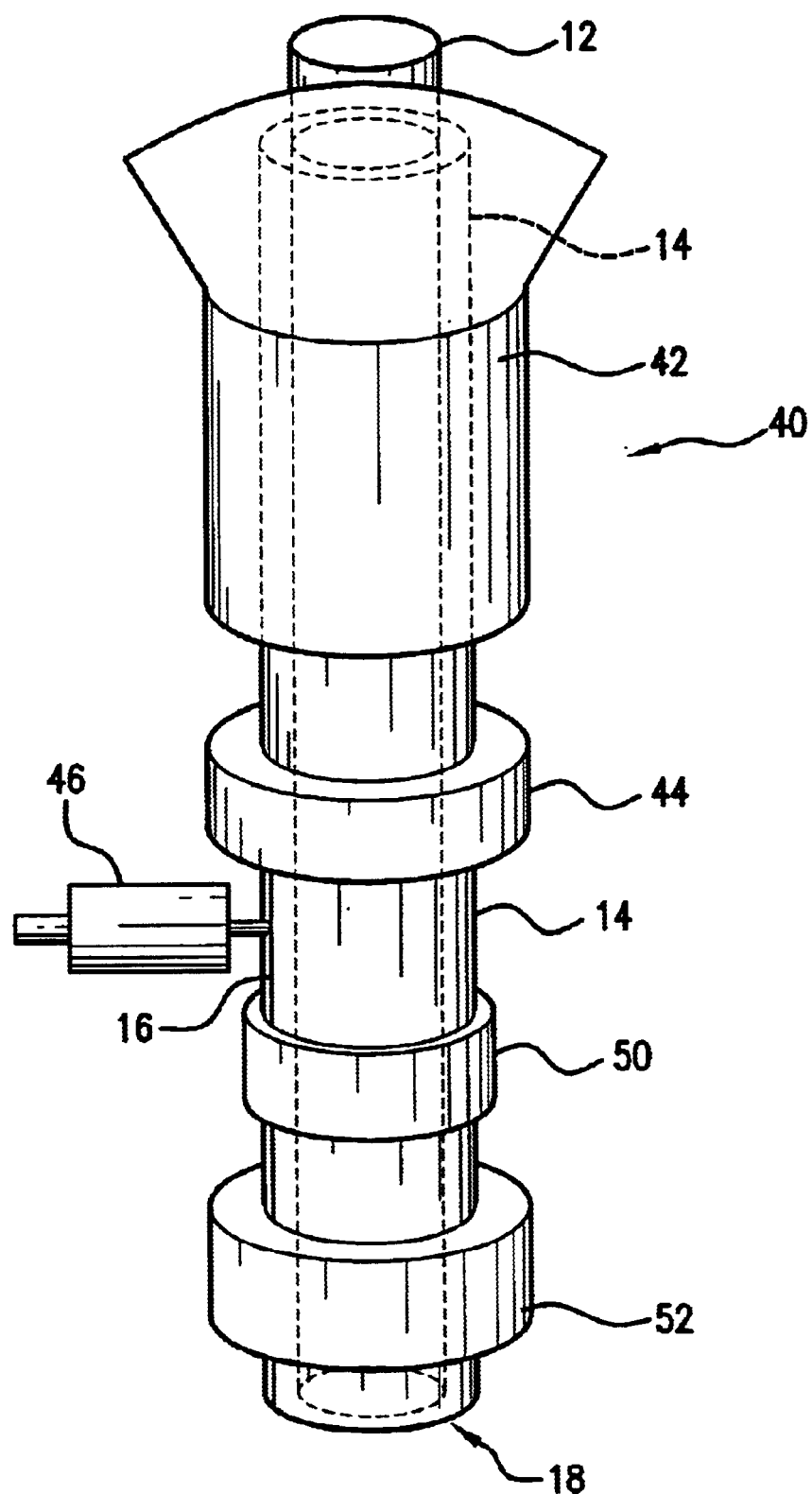
FIG. 3 is a schematic diagram of a tandem system and method for coloring an optical fiber, according to another embodiment of the present invention.

According to another embodiment shown in FIG. 3, the system 40 applies one or more stripes 16 using a tandem coloring process. The tandem system 40 includes a coloring die 42 that receives the optical fiber core section 12 coated with the coating 14. The coloring die 20, 42 can be any type known in the art, for example, as disclosed in U.S. Pat. No. 4,125,644, incorporated herein by reference.

A semi-cure station 44 partially cures the coating 14 having the base color. The partial curing is accomplished when the coating 14 is cured sufficiently to stay on the optical fiber core section 12 and with enough uncured material to allow the stripe(s) 16 to displace a portion of the coating 14. As discussed above, the semi-cure station 44 also depends on the type of curable material and is known in the art.

One or more striping nozzles 46 are located after the semi-cure station 44 to apply the one or more stripes 16 to the partially cured coating 14. Examples of the striping nozzle 46 include ink jet or laser jet printer head mechanisms. Other types of nozzles or paint devices can also be used. The striping nozzle 46 can be used to provide a small enough stripe 16 such that the overall diameter of the fiber is substantially unaffected. If further control of the diameter is necessary, however, another die 50 can be used after the striping nozzle(s) 46 to assure a substantially uniform diameter of the coated fiber. A full cure station 52 then fully cures the coating 14 and the stripe 16 to produce the colored fiber 18.

Figure 4:
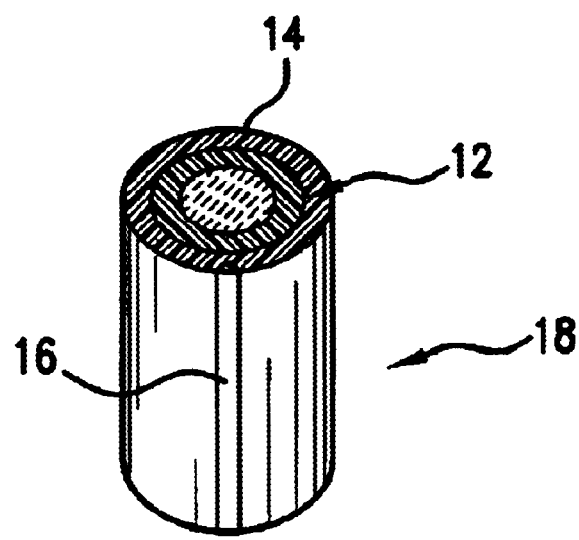
FIG. 4 is a perspective cross-sectional view of a colored optical fiber, according to one embodiment of the present invention.
Figure 5:
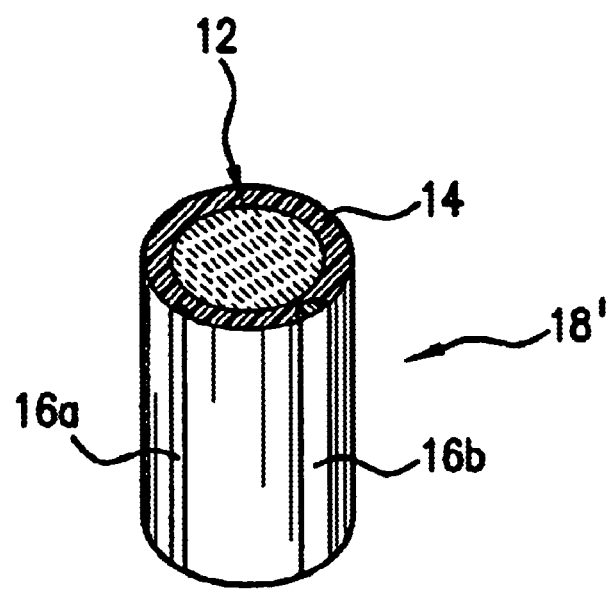
FIG. 5 is a perspective cross-sectional view of a colored optical fiber, according to another embodiment of the present invention.

Embodiments of the colored optical fiber 18, 18', formed according to the system and method of the present invention, are shown in FIGS. 4 and 5. FIG. 4 shows an embodiment in which the base color coating 14 is applied over a coated glass core section 12, and a single stripe 16 is formed in the base color coating 14. FIG. 5 shows an embodiment in which the base color coating 14 is applied over a glass core section 12, and multiple stripes 16a, 16b are formed in the base color coating 14. The stripes 16a, 16b can have the same stripe color or have different stripe colors. In one preferred embodiment, the base color coating 14 is about 1/50 of the overall fiber diameter, although other thicknesses are possible. In both embodiments, the stripes 16 do not substantially alter the overall diameter of the striped fiber 18, 18', i.e., in a way that will add to attenuation and degrade the performance of the fiber optic cable.

Another embodiment of a tandem coloring system 60 is shown in FIGS. 6–8. This tandem coloring system 60 includes a first coloring die 62 for applying the first curable material and forming the base color coating 14. The exit portion 64 of the first coloring die 62 is configured to control the first curable material and maintain a substantially uniform diameter of a portion of the base color coating 14 leaving one or more gaps 66, as shown in FIG. 7. The gap 66 is a section at a lower diameter at or close to the diameter of the core section 12. A first cure station 68 cures the base color coating 14.

A second die 72 applies the second curable material to the gap(s) 66 to form the stripe(s) 16. The exit portion 74 of the second die 70 controls the second curable material and maintains the diameter of the stripe(s) 16 substantially uniform with the diameter of the base color coating 14, as shown in FIG. 8. A second cure station 78 cures the second curable material to form the colored optical fiber 18.

The coloring dies 20, 42, 50, 62, 72 are shown schematically to illustrate the inside profile of the dies without showing the overall shape and configuration. In general, the coloring dies 20, 42, 50, 62, 72 are based upon known designs and can have any outside shape or configuration.

Accordingly, the coloring system and method of the present invention is capable of creating a striped pattern on an optical fiber without creating a non-uniform diameter likely to increase attenuation and degrade fiber performance in the fiber optic cable.

Modifications and substitutions by one of ordinary skill in the art are considered to be within the scope of the present invention, which is not to be limited except by the following claims.

The invention claimed is:

1. A method of coloring an optical fiber, said method comprising:
    applying a base color coating of a first curable material to an optical fiber core section, said base color coating having a base color, wherein said base color coating is applied by coating said optical fiber core section in a die and passing said coated optical fiber core section through an exit portion of said die having a longitudinal channel for controlling said diameter of said colored optical fiber;
    applying at least one stripe of a second curable material to said base color coating before said base color coating is fully cured, said stripe having a stripe color different from said base color, and wherein said stripe is formed in said base color coating such that a diameter of said optical fiber remains substantially uniform; and
    curing said base color coating and said stripe.

2. The method of claim 1 wherein applying said stripe includes injecting said second curable material against said base color coating using a nozzle.

3. The method of claim 2 further comprising partially curing said base color coating before applying said stripe using said nozzle.

4. The method of claim 3 further comprising passing said optical fiber core section having said base color coating and said stripe through another die to maintain a substantially uniform diameter.

5. The method of claim 3 wherein curing said base color coating and said stripe includes passing said base color coating and said stripe through a full cure station.

6. The method of claim 1 wherein applying said stripe includes injecting said second curable material through an aperture in a side wall of said die.

7. The method of claim 1 further comprising partially curing said base color coating before applying said stripe.

8. The method of claim 1 wherein said first curable material and said second curable material are different types of material.

9. The method of claim 1 wherein applying said at least one stripe includes applying a plurality of stripes.

10. The method of claim 1 wherein said first curable material and said second curable material are UV-curable materials.

11. A method of coloring an optical fiber, said method comprising:
    applying a base color coating of a first curable material to an optical fiber core section, said base color coating having a base color;
    receiving said optical fiber core section coated with said base color coating in a main portion of a coloring die;
    passing said optical fiber core section coated with said base color coating through an exit portion of said coloring die extending from said main portion, said exit portion defining a substantially straight longitudinal passageway having a substantially uniform diameter, for maintaining said optical fiber at a substantially uniform diameter; and
    applying at least one stripe of a second curable material to said base color coating before said base color coating is fully cured, said stripe having a stripe color different from said base color, wherein said at least one stripe is applied by injecting said stripe through a side aperture in said exit portion using at least one striping tube coupled to said exit portion, whereby said stripe is formed in said base color coating such that a diameter of said optical fiber remains substantially uniform; and curing said base color coating and said stripe.

12. The method of claim 11 further comprising:

injecting a plurality of stripes through a plurality of side apertures in said exit portion using a plurality striping tubes coupled to said exit portion.

13. A method of coloring an optical fiber, said method comprising:

coating an optical fiber core section with a base color coating of a first curable material to form a coated optical fiber core section, said base color coating having a base color;

passing said coated optical fiber core section into a die;

injecting a second curable material through an aperture in a side wall of said die to apply at least one stripe to said coated optical fiber core section, said stripe having a stripe color different from said base color;

controlling a thickness of said base color coating and said stripe by passing said coated optical fiber core section through a longitudinal channel of said die such that a diameter of said colored optical fiber remains substantially uniform; and curing said base color coating and said stripe.

14. The method of claim 13 wherein the step of curing said base color coating and said stripe includes curing said base color coating and said stripe simultaneously in a cure station.

15. A method of coloring an optical fiber, said method comprising:

applying a base color coating of a first curable material to an optical fiber core section to form a coated optical fiber core section, said base color coating having a base color;

applying at least one stripe of a second curable material to said coated optical fiber core section, said stripe having a stripe color different from said base color;

controlling a thickness of said base color coating and said stripe such that a diameter of said colored optical fiber remains substantially uniform; and curing said base color coating and said stripe, wherein the step of curing said base color coating and said stripe includes:

partially curing said base color coating before applying said stripe; and fully curing said base color coating and said stripe after applying said stripe.

16. The method of claim 15 wherein the steps of applying and controlling the thickness of said base color coating include:

coating said optical fiber core section; and passing said coated optical fiber core section through a first die.

17. The method of claim 16 wherein the step of applying said stripe includes injecting said second curable material against said base color coating using a nozzle.

18. The method of claim 17 wherein the step of controlling the thickness of said base color coating and said stripe includes passing said colored optical fiber through a second die before the step of fully curing said base color coating and said stripe.

19. A method of coloring an optical fiber, said method comprising:

applying a base color coating of a first curable material to an optical fiber core section to form a coated optical fiber core section, said base color coating having a base color, wherein said base color coating is applied using a first die;

passing said coated optical fiber core section through said first die to provide a gap in said base color coating;

applying at least one stripe of a second curable material to said coated optical fiber core section, said stripe having a stripe color different from said base color, wherein said stripe is applied to said gap in said base color coating using a second die;

passing said coated optical fiber core section through said second die, wherein said first die and said second die control a thickness of said base color coating and said stripe such that a diameter of said colored optical fiber remains substantially uniform; and curing said base color coating and said stripe.

20. The method of claim 19 wherein the step of curing said base color coating and said stripe includes first curing said base color coating after passing said coated optical fiber core section through said first die and then curing said stripe after passing said coated optical fiber core section through said second die.

* * * * *